Nov. 16, 1965  G. R. KNIGHT, JR  3,217,904
BULK CARRIER AND METHOD FOR DISCHARGING SAME
Filed March 31, 1964
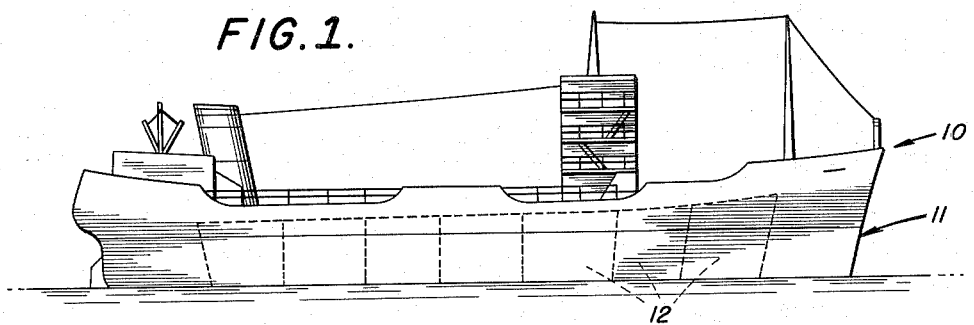
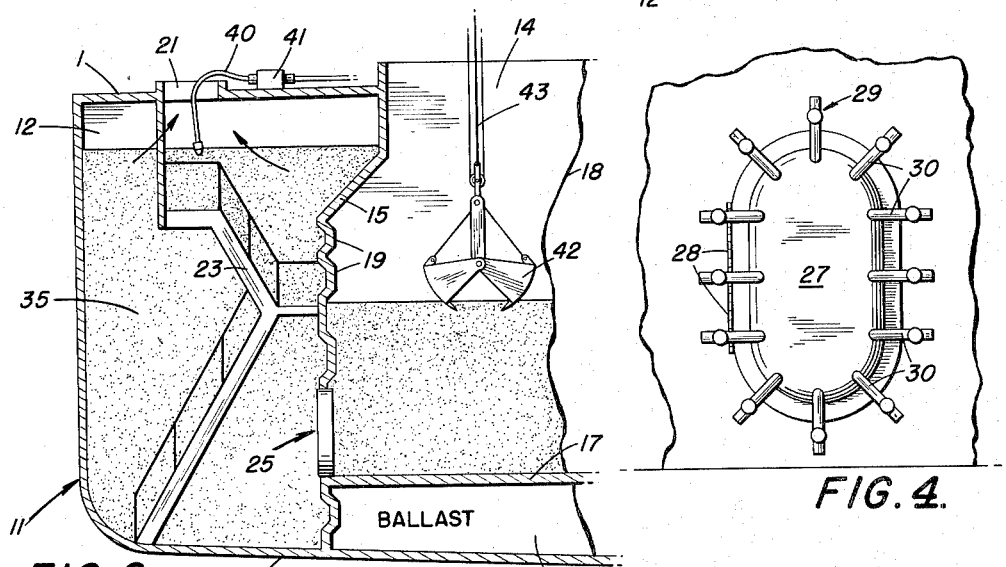
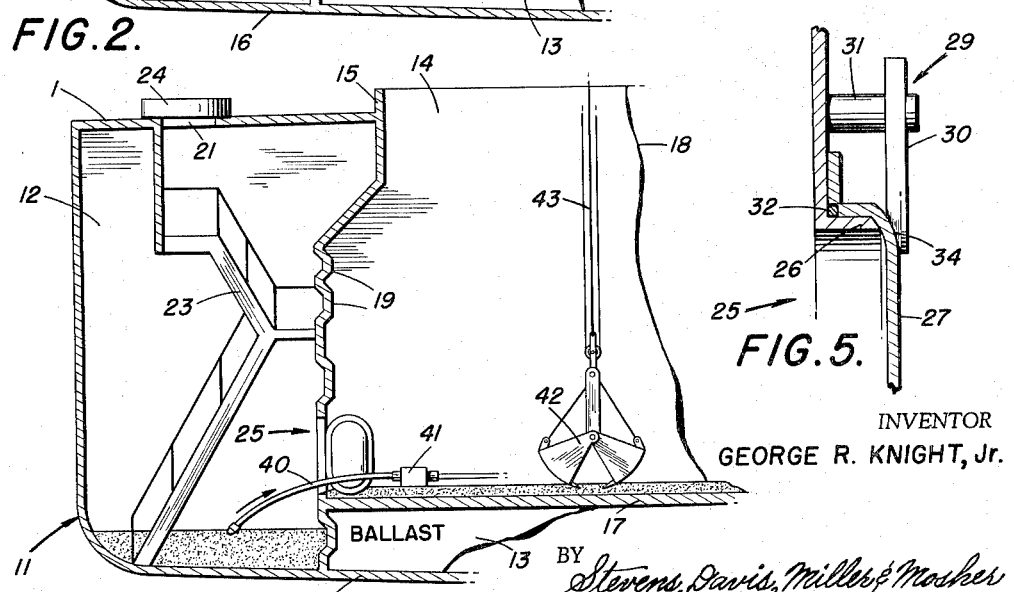
INVENTOR
GEORGE R. KNIGHT, Jr.
ATTORNEYS United States Patent Office 3,217,904
Patented Nov. 16, 1965

3,217,904
BULK CARRIER AND METHOD FOR
DISCHARGING SAME
George R. Knight, Jr., Port Washington, N.Y., assignor to John J. McMullen Associates, Inc., New York, N.Y., a corporation of New York
Filed Mar. 31, 1964, Ser. No. 356,255
9 Claims. (Cl. 214—15)

The present invention relates to an arrangement for a bulk carrier freighter, and more particularly to a freighter for carrying grain and to a method for removing grain from the holds of the freighter.

One object of the present invention is to provide a method and means for removing grain from deep grain carrying holds of the freighter in which the suction or vacuum lift means used heretofore in emptying said holds have not proved efficient particularly in emptying the grain stored in the lower or bottom portion of the holds due to the excessive load placed on the vacuum lifting means.

It is an object of the present invention to provide a bulk carrier freighter constructed so that it may carry large quantities of bulk material such as wheat and other grains in deep holds or compartments of the vessel which bulk material may be readily loaded therein and just as readily discharged and removed therefrom.

It is another object of the present invention to provide a method of removing bulk material that has been transported from one location to another in the hold of a bulk carrier freighter or ship by a quick and inexpensive method.

It is another object of the present invention to provide a bulk carrier freighter or ship adapted to transport large quantities of grain in the holds of the ship with means for readily removing and discharging the grain from the holds of the ship by suction or vacuum lift means which require a minimum amount of power.

It is another object of the present invention to provide a bulk carrier freighter in which loose grain is carried in the hold or compartment of the ship and in which the upper portion of the grain in the hold may be readily removed by suction means through one discharge opening, and as the compartment or hold progressively empties and the level of grain therein decreases, other means and method are provided for discharging and removing the remaining portion of the grain through other discharge or opening means in the hold, which method requires much less energy and equipment of less power to remove the remaining portion of the grain from the hold.

It is another object of the present invention to provide a bulk carrier freighter with a wing tank or outboard grain storage hold therein for transporting grain from one location to another, with sluice hatch means disposed in the lower portion of the hold so that after a predetermined amount of grain is removed from the hold, a portion of the remaining grain within said hold may be discharged by gravity through said hatch means to another hold where it is easily accessible for removing it from the freighter to a dock or the like, and a third or the last remaining portion of grain still disposed and located in the bottom of the hold may be further discharged from the hold through said hatch means by suction or vacuum lift means in a simple and inexpensive operation.

It is another object of the present invention to provide a bulk carrier freighter for carrying grain having means therein for removing the last portion of the grain from a relatively deep hold or compartment in the ship by providing discharge means in the lower portion or wall of the hold, which discharge means do not in any way interfere with the over-all water-tightness required in the freighter and which do not interfere with structural strength requirements of the ship.

It is another object of the present invention to provide a bulk carrier freighter for carrying grain and the like having a plurality of relatively deep grain carrying compartments or holds therein for carrying grain in which the holds may be quickly filled by gravity flow with the grain to be transported, and quickly emptied of the grain when the freighter has reached its destination by providing discharge means in the lower inner portion or wall or inboard side of the hold for quickly removing the grain from the lower portion of the hold and which means do not interfere with the over-all structure of the freighter including the longitudinal bulkheads generally forming the main structural frame in such a freighter.

It is another object of the present invention to provide a bulk carrier freighter for carrying grain having a plurality of substantially vertical and deep grain carrying compartments or holds in which the major portion of the grain may be discharged from the hold by conventional equipment now in use, and in which suction lift means can be combined with bucket or grapple conveyor means for removing the grain carried in the hold from the ship.

It is another object of the present invention to provide a bulk carrier freighter having a plurality of substantially deep holds or compartments therein for carrying grain and which holds or compartments may be readily filled with grain and emptied thereof through sluice hatches disposed in the main vertical bulkheads extending longitudinally of the ship and which sluice hatches still maintain the required water-tight integrity of the ship.

Various other objects and advantages of the present invention will be readily understood from the following detailed description when considered in connection with the accompanying drawings forming a part thereof and in which:

FIGURE 1 is a side elevational view of a bulk carrier freighter or ship for transporting grain from one place to another in which the present invention is embodied;

FIGURE 2 is an enlarged fragmentary transverse section of the ship shown in FIGURE 1 taken approximately amidship illustrating the present invention and the method of removing grain from a hold of the ship which hold has a great depth vertically;

FIGURE 3 is a view similar to FIGURE 2 but illustrating the method of emptying the grain from the bottom of the compartment when the major portion of the grain stored therein has already been removed;

FIGURE 4 is an enlarged fragmentary front view of the sluice hatch or discharge means embodied in the present invention; and FIGURE 5 is a fragmentary detail view in section of the sluice hatch means embodied in the present invention.

Referring to the drawings, the reference numeral 10 generally designates a bulk carrier freighter or ship for carrying grain such as wheat and the like. As shown in FIGURE 1 in dotted lines, the interior of the hull 11 of the vessel is divided into a large number of cargo storage holds 12 of substantial vertical depth extending from a point adjacent the bow to a point adjacent the stern. These holds are disposed adjacent both outboard sides of the hull and are sometimes referred to as wing tanks. The central longitudinal portion of the ship is provided with a plurality of ballast tanks 13. The ballast tanks 13 as best shown in FIGURES 2 and 3 are relatively wide compared with their depth and form a double bottom along the longitudinal central bottom section of the ship. Disposed immediately above the ballast tanks and between wing holds 12 is a large center compartment 14, also extending from a point adjacent the bow to the stern of the ship. Compartments 14 are also used to carry and store grain therein and are generally referred to in the art as cargo holds.

The main structure of the ship includes two longitudinally extending vertical bulkheads 15 as shown in FIGURES 2 and 3 which extend from the keel or bottom of the ship 16 to a point adjacent the main deck 1. Transverse horizontally disposed bulkheads 17 extend between the two vertical longitudinal bulkheads 15 while transverse vertical bulkheads 18 form partitions separating the holds from one another in a fore and aft direction. The entire structure, namely the bulkheads 15, 17, and 18, together with the ship's hull, forms the main structural frame of the ship.

It is to be noted that the longitudinal bulkheads 15 are provided with a plurality of longitudinally extending and vertically spaced ribs 19 therein to give additional strength to the bulkheads, and bulkheads 15, together with the hull 11, partitions 18, and the deck 1, form water-tight compartments adjacent the starboard and port sides of the ship to preserve the water-tight integrity thereof and seal off the interior or central portion of the ship, that is, the area within the holds 14 and tanks 13, should the outside of the hull be damaged or ruptured from any cause whatsoever, such as severe storms at sea, should the ship collide with other ships or a dock upon coming into a port, or be ruptured due to floating objects in the water through which the ship is passing such as large logs and the like.

The holds 12 are further maintained water-tight by having an unbroken deck 1 thereover, except for a small circular loading and unloading hatch member 21 therein provided with a water-tight closure member. The access hatch 21 consists of a small cylindrical member or sleeve projecting above the deck and welded to an opening cut in the deck. The cross-section of the hatch opening is approximately 23 to 24 inches in diameter so that personnel may squeeze through the opening and enter the hold to go down a ladder or stairway 23 therein in order to clean out material in it or on the inside walls thereof. The hold 12 can have more than one hatch 21 therein, and the hold is used to store and carry bulk material such as grain therein to transport it from one place to another. The grain is loaded into the hold 12 by removing the water-tight covers 24 of the hatches and discharging through conventional chute means, not shown, from a dock-side and the like, the wheat or other grain to be carried in the holds until the entire volume of the hold is completely filled. When the hold has been completely filled with the grain, the water-tight closure member 24 is thereafter secured over the opening 21.

Hold 12 is provided with a sluice hatch or discharge opening 25 therein in the lower portion of the longitudinal bulkhead 15 and above the transverse bulkhead 17, as best shown in FIGURES 2 and 3. The sluice hatches are relatively small when compared with the total area of the bulkhead 15 forming the inner wall of the hold 12, so that the water-tight integrity of the hold and the ship is properly maintained. The sluice hatch member 25 enables the bulk material grain carried in the hold 12 to be removed and emptied thereof in an efficient and economical manner not accomplished heretofore. The hatch member 25 is formed of an annular flange member 26, either formed integral with the bulkhead 15 or prefabricated and thereafter secured thereto by welding in an opening cut in the bulkhead 15, with the flange member 26 extending into the center hold 14.

The sluice hatch opening 25 is provided with a hatch door 27 for sealing off the hold from the center hold 14 there adjacent. The door 27 is provided with a plurality of hinge members 28 shown in FIGURE 4, so that the door may be swung in an inward direction to open the hatch for access to the hold 12. A plurality of dog members 29 having rotatable arms 30 pivotally connected to horizontal support bars or rods 31 welded to the inside of bulkhead 15 around the door is provided for maintaining the door seated on the flange 26 in a water-tight relationship. An elastomer ring gasket 32 is disposed in a continuous recess in door 27 to contact the edge of flange member 26 and form a water-tight seal. Dog members 29 are provided with a concave or tapered surface 34 adjacent their outer end so that all of the dogs 29 will properly bear against the door 27 to seat it in a water-tight relationship when it is closed, the tapered surface compensating for any variances in the tolerance dimensions of the dog members.

In accordance with the present invention, when the bulk carrier freighter is to transport grain, it is brought alongside a dock, not shown, and is loaded by removing the closure member 24 from the hatch of hold 12. Thereafter conventional chute means fill the hold or holds with grain indicated as 35 until it is completely filled, or until as much grain that is to be transported occupies the holds. Thereafter the closure member 24 is disposed on the opening 21 in a water-tight fashion. At the time of loading the grain in hold 12, it is realized that the hatch door 27 is properly secured so that the grain will not spill out and empty into the center hold 14.

Other grain is also loaded into the center holds 14 by conventional chute means until they are filled to the desired level. The center tanks 14 are provided with hatches for access thereto which are not shown. The hatches disposed on the center tanks 14 may be of any size and may be substantially the full width of the center tank or at any rate of very large size if desired so that any type cargo may be loaded therein. There is no problem in connection with the size of the hatches for the center tanks 14 since they are less apt to be ruptured or damaged and do not require the water-tight integrity that must be maintained by the holds 12, which are disposed on the outside or adjacent the hull or skin of the ship.

After the ship has been properly loaded with grain in all desired holds, the water-tight hatch doors, not shown, for the center tanks are secured, and the ship thereafter transports the grain to its destination.

After the ship pulls alongside the dock where it is to unload its cargo of grain, the closure member 24 is removed and a suction hose 40 connected to a vacuum lift pump 41, or other suction lift means is used to create a vacuum and to suck out and remove the grain from hold 12 and to discharge it to a conventional storage place, not shown, on the dock. The flexible suction hose 40 shown in FIGURE 2 communicates through the hatch 21 with the interior of the hold 12, and the grain is vacuum lifted out of the upper portion of the hold in the direction indicated by the arrows therein.

The center tank 14 has the grain removed therefrom by a conventional material handling device such as a crane provided with a grapple bucket or shovel 42 connected to the end of cable means 43 and lowered into the center tank 14. Both the vacuum lift means 41 and the grapple means 42 can be used simultaneously in order to discharge the grain cargo from the holds of the ship. It is obvious that the grapple type article handling means 42 cannot be utilized to remove the grain from the relatively deep holds 12 due to the fact that the small access opening or hatch 21 in the deck does not permit the article material handling device to enter within the hold 12 in order to properly empty it of the grain carried therein, so that a vacuum lift pump means or a suction lift means is required to empty these holds 12.

Heretofore, due to the great depth of the holds 12, which are approximately 35 to 45 feet in depth, as the grain is removed therefrom and the hold is progressively emptied so that the level of the grain therein gradually decreases, a progressively greater load is placed upon the vacuum lift means since the grain in the bottom of the tank must now be lifted a substantial distance. It is often occurred that the hold has not been completely emptied of its contents so that the dregs left in the tank would contaminate other loads of grain transported later by the ship, and the load eventually had to be discarded with a consequent waste of material and expense. Not completely emptying the holds has also entailed the necessity of excessive maintenance in requiring personnel to enter the tank to completely remove these dregs manually.

In accordance with the present invention, after the suction lift 41 and the hose 40 connected thereto have been used to remove the portion of the grain adjacent the upper portion of the hold 12 and before the vacuum lift load becomes excessive and too great a load is placed on the vacuum lift pump means, the remaining portion of the grain in hold 12 is removed by opening the hatch door 27 as shown in FIGURE 3. It is, of course, obvious that any grain in the center tank 14 has first been removed by the grapple bucket means 42 so that the tank is empty or relatively empty, and the level of any grain remaining in the hold 14 is disposed below the level of the sluice hatch therein. Thereafter, the hatch door 27 is opened by disengaging the dog members 29 therefrom, and the hatch door 27 is swung inwardly. The grain within the tank or hold 12 above the level of the hatch door 27 will then fall by gravity through the hatch opening into the lower portion of the center tank 14. In other words, the grain from hold 12 will seek its own level. Thereafter, the grain that fell into the center hold by gravity is removed through the center tank hatch by the grapple bucket means 42. After the grapple bucket means 42 has emptied this grain from center hold 14, the suction lift means 41 and hose 40 are lowered into the bottom of hold 14, as shown in FIGURE 3, and hose 40 is inserted through the sluice hatch opening 25, and the grain is lifted by vacuum or suction from the lower portion of the hold 12 and discharged into the bottom of the center hold 14. Therefore, grapple means 42 is used to lift it from the center hold.

When all of the grain has been removed from hold 12, the water-tight hatch door 27 is then dogged closed again, and the freighter is ready to put to sea and still maintain its water-tight integrity.

In summary then, the grain is removed from the deep wing holds by first removing grain in the upper portion thereof through the deck hatch by vacuum lift means, by thereafter discharging grain by gravity from the wing hold through the sluice hatch into the center tank and removing it by grapple lift means, by thereafter placing the suction lift means in the bottom of the center hold, suctioning the remaining grain therein into the center hold, and grapple lifting it off the ship through the center hold hatch.

From the foregoing description, it is apparent the present invention provides a novel bulk carrier freighter with means for maintaining and preserving the water-tight integrity of the ship through the usual longitudinally extending bulkhead structure disposed in ships and which further provides a cargo area for transporting grain in the outer holds or compartments of the ship, with an efficient method and means of removing the grain carried in these deep wing holds when it reaches its place of destination.

The present invention further provides a method of completely emptying the outer holds or wing tanks of wheat and other grains by utilizing vacuum or suction lift means without placing an excessive lift or load upon the suction means, and which properly empties the wing tanks, thereby reducing maintenance cost, involved heretofore in constantly cleaning the interior of the tanks, and without any possibility of remaining grain not being properly emptied from the wing tanks to contaminate another load of grain carried therein at later periods.

It will be realized that many modifications and variations of the present invention are possible in the light of the above description and teachings. It is, therefore, to be understood that within the scope of the appended claims the invention may be practiced otherwise than as specifically described herein.

What is claimed is:

1. A bulk material carrier freighter for carrying grain including a hull with two longitudinal bulkhead members extending between the bow and stern of the ship, said bulkhead members being disposed inwardly of each side of the hull to form a grain carrying hold adjacent each side of the hull, said bulkhead members being spaced laterally from each other to form a central grain carrying hold between said side holds, said bulkhead members being substantially vertical and extending vertically from the bottom keel portion of the hull upwardly to the main deck, said deck and keel portion forming the top and bottom of said side holds, substantially vertical transverse bulkheads forming the front and rear end walls of all said holds, said side holds being substantially water-tight and completely closed, a small access hatch means disposed in the top of said side holds for communication with the interior of said side holds for filling said side holds with grain and removing grain therefrom, and suction means for vacuum lifting grain from said side holds, sluice hatch means disposed in the lower portion of said longitudinal bulkhead members and in the portion thereof forming the inner side wall of said side holds, said sluice hatch means providing a discharge opening for emptying grain from said side holds after grain in the upper portion of said side holds has been removed by said suction means, and means for opening and closing said hatch means.

2. The freighter of claim 1 wherein said sluice hatch means when opened communicate with said center grain hold so grain in said side holds at a higher level than said hatch means falls by gravity into said center hold.

3. The freighter of claim 2 wherein sluice hatch means comprises an annular flange member secured in an opening in said longitudinal bulkhead, and said means for opening and closing said hatch means includes a hinged water-tight door, and dog members disposed on said longitudinal bulkhead for clamping said door in a closed position.

4. The freighter of claim 3 wherein bucket grappling means are provided for lifting grain that has fallen from said side holds into said center hold, and other suction means are provided for vacuum lifting grain from the lower portion of said side holds out through said sluice hatch means.

5. The freighter of claim 4 wherein a plurality of side holds and center holds are provided in said freighter disposed sucessively from its bow to its stern.

6. The freighter of claim 4 wherein a ballast compartment is disposed below said center hold and forms the bottom of it, and said bottom is located substantially above the bottom of said side holds.

7. The freighter of claim 6 wherein said longitudinal bulkheads are provided with longitudinal ribs therein.

8. A method of unloading grain from a wing tank in a bulk carrier freighter wherein the wing tank is completely watertight and closed except for a small hatch in the top thereof and a sluice hatch in the lower inboard wall thereof comprising vacuum lifting the grain from the upper portion of the wing tank to reduce the level of grain remaining therein, opening the sluice hatch so grain will fall by gravity into the center tank of the freighter and reduce the level of grain to a still lower level in said wing tank, removing the gravity discharged grain from the center tank and thereafter vacuum lifting through the sluice hatch the remaining portion of grain from the wing tank until it is completely empty.

9. The method of claim 8 wherein said gravity discharged grain is removed from the center tank by loading it in containers and lifting the containers upwardly.

References Cited by the Examiner
UNITED STATES PATENTS

| | | | |
|---|---|---|---|
| 802,395 | 10/1905 | Holland et al. | 214—15 |
| 1,614,859 | 1/1927 | Wilson | 214—15 |

HUGO O. SCHULZ, *Primary Examiner.*